Patented June 16, 1953

2,642,431

UNITED STATES PATENT OFFICE 2,642,431

1-KETO-3-BUTYL-4-HYDROXY-1,2,3,4-TETRAHYDROISOQUINOLINE

Glenn E. Ullyot, Philadelphia, Pa., assignor to Smith, Kline & French Laboratories, Philadelphia, Pa., a corporation of Pennsylvania No Drawing. Application September 20, 1949, Serial No. 116,866

1 Claim. (Cl. 260—289)

This invention relates to new chemical compounds and more particularly to certain new and useful tetrahydroisoquinolon compounds.

New compounds in accordance with this invention will have utility as intermediates for use in the preparation of compounds, more particularly certain pyridine derivatives which will be useful for the preparation of certain novel aminoalkoxy-isoquinoline derivatives which have physiological properties, more particularly analgesic and local anesthetic properties. The new compounds in accordance with this invention comprise compounds having the following structure:

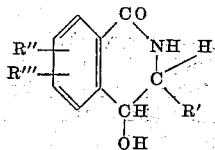

where R' is a member of the group consisting of hydrogen, alkyl groups having not more than ten carbon atoms, a phenyl group and phenyl alkyl groups, the alkyl portion of which has not more than three carbon atoms; R'' and R''' are members of the group consisting of hydrogen, hydroxyl, methyl, methoxy, ethoxy, amino, acylamino having not in excess of 5 carbon atoms, and alkylamino having not in excess of 3 carbon atoms, the said substituents being so chosen that the number of nitrogen atoms in the substituents does not exceed 1.

By way of illustration, compounds according to this invention may be exemplified by compounds having the following structures:

A

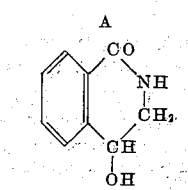

B

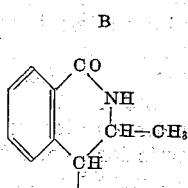

C

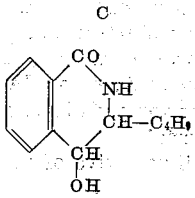

D

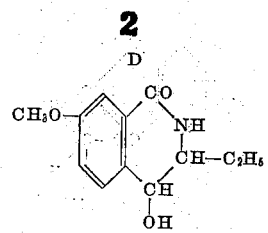

E

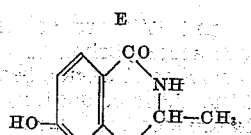

F

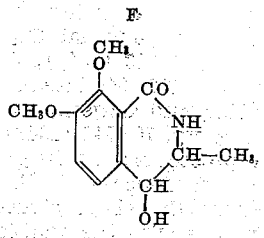

G

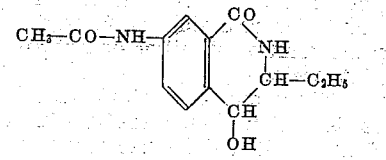

H

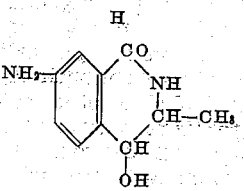

I

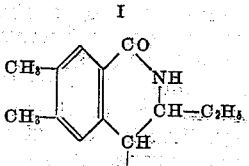

J

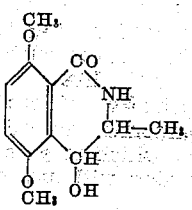

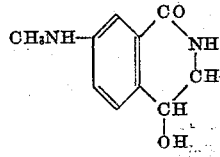

The compounds in accordance with this invention will be prepared by rearrangement of a compound having the following structure

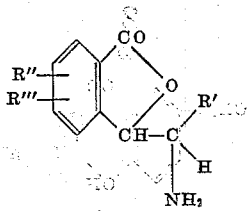

where R', R" and R'" are as defined above, which broadly is accomplished by dissolving the compound in a solvent, it having been found that compounds of the above structure will be caused to rearrange to produce the indicated compounds by putting them in solution.

For the preparation of typical starting material having the above structure for the preparation of compounds according to this invention see Ullyot et al., Journal Organic Chemistry, vol. 10, pp. 429–440 (1945), United States Letters Patent No. 2,473,484, dated June 14, 1949, and Ullyot, Taylor, and Dawson, Journal American Chemical Society, 70, 542 (1948).

Desirably, in proceeding for the preparation of compounds in accordance with this invention, compounds having the above structure will be caused to rearrange with the addition of an alkali, as, for example, sodium hydroxide, ammonia, or the like, to the solution of the compounds and also desirably by the application of heat to the solution whether or not an alkali is included therein.

In proceeding one may start with a salt of the base, in which case procedure in the presence of an alkali will be necessary to initially liberate the base for rearrangement.

More specifically, in proceeding according to this invention the free base, or salt, will be dissolved in a suitable solvent such as, for example, water, aqueous alcohol, or other suitable solvent.

When the procedure is carried out with use of an alkali, such will desirably be present in amount equal to one or more molar proportions.

If heat is applied, such may be applied at any convenient temperature up to about the boiling point of the solvent and when heat is applied the rearrangement will be effected in from about one to four hours. The product compound will usually separate as a solid or an oil and will be recovered by filtration or extraction with a solvent, such as benzene, chloroform, ether, or the like, and purified, when necessary, by any well known procedure. If the product does not spontaneously separate, its separation may be promoted by the addition of acid, or by extraction with a suitable solvent, such as ether, benzene, chloroform, or the like.

As further illustrative of procedure for the production of compounds according to this invention, an amine, which may be obtained from its salt by proceeding with use of an alkali to initially liberate the free base, having the following structure

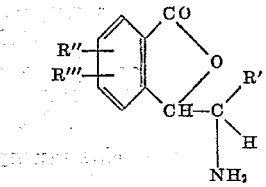

where R', R" and R'" are as defined above, is dissolved in a solvent to cause rearrangement to the product compound.

Again, for the preparation of compounds embodying this invention, to a solution of a salt of an amine having the above formula in any suitable solvent, such as water, aqueous ethanol, aqueous isopropanol, or the like, is added an alkali such as sodium hydroxide potassium hydroxide, ammonia, or the like, and the resulting solution allowed to stand at room temperature until rearrangement occurs. If desired, and for a saving of time it generally will be desirable, the solution or mixture of the amine salt and alkali may be heated to hasten the rearrangement.

When the rearrangement has occurred, the rearranged product will, in certain cases, separate from the solution and may be readily recovered. Again, where the rearranged product does not readily separate from the solution, separation may be accomplished by concentrating the solution and cooling.

As more specifically illustrative of the preparation of compounds in accordance with this invention, the amine salt is dissolved in any convenient amount of water, for example, 0.1 m. in 100 cc. of water, and either one or two or more equivalent amounts of alkali are added to the solution. Where one equivalent of alkali is used, the resulting free amine may separate from the solution as an oil. However, when two equivalents of alkali are used, an oil may separate but usually quickly redissolves.

The resulting alkaline solution or mixture is heated to a convenient temperature, say 75° C. Rearrangement will occur in about 1–3 hours, with separation from the hot solution of the rearranged product, which can be readily recovered by any convenient procedure. As has been indicated, if the rearranged product does not separate out when rearrangement has occurred, the solution or mixture may be concentrated and then cooled to effect separation of the rearranged product.

The amine starting material, since it has two asymmetric carbon atoms, except in the case when R' is hydrogen, is capable of existing as two racemic forms and has four optically active forms. The method according to this invention applies to the racemic forms and to the optically active forms. Thus, when the amine salt starting material is a mixture of racemic forms, the product is obtained as a mixture of racemic forms. Likewise, when the starting material is an individual racemic form or an optically active form, the product will be an individual racemic form or an optically active form, as the case may be with the starting material.

As specifically illustrative of procedure for the preparation of compounds according to this invention:

Example 1

For the preparation of 4-hydroxy-1,2,3,4-tetrahydroisoquinolon-1

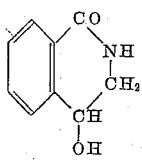

79.8 grams of aminophthalidylmethane hydrochloride was dissolved in 100 cc. of warm water. Twenty-eight cubic centimeters of 40% sodium hydroxide was added and the solution was heated on a steam bath for five hours. After the reaction mixture stood overnight, 68.3 g. of a crystalline product was isolated. A sample recrystallized from water melted at 163–164° C. (capillary).

Anal. calcd. for $C_9H_9O_2N$: N, 8.58. Found: N, 8.64, 8.48.

Example 2

For the preparation of 4-hydroxy-3-methyl-1,2,3,4-tetrahydroisoquinolon-1

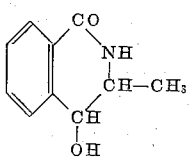

21.4 grams of 1-amino-1-phthalidylethane hydrochloride, a mixture of two racemic forms, was dissolved in 100 cc. of water and 7 cc. of 40% sodium hydroxide was added. The solution was heated to boiling for three minutes and then at 95° C. for three hours. On cooling, a crystalline product, which melted at 120–145° C. and which consisted of a mixture of two racemic forms, was isolated.

In a similar experiment 10.7 g. of 1-amino-1-the higher melting racemic form, isomer A, of melting point 292–295° C. were rearranged. The product obtained was the lower melting 4-hydroxy-3-methyl - 1,2,3,4-tetrahydroisoquinolon-1, isomer B, which after recrystallization from ethyl alcohol melted at 161–163° C.

Anal. calcd. for $C_{10}H_{11}O_2N$: C, 67.78; H, 6.27; N, 7.91. Found: C, 68.22, 67.94; H, 6.08, 6.18; N, 7.94, 8.04.

Rearrangement of 1-amino-1-phthalidylethane hydrochloride of melting point 222–232° C. dec., gave a product which after crystallization from methyl alcohol melted at 166.5–177.5° C.

Example 3

For the preparation of 4-hydroxy-3-ethyl-1,2,3,4-tetrahydroisoquinolon-1

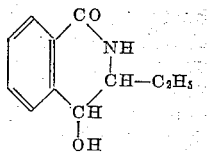

518 grams of 1-amino-1-phthalidylpropane hydrochloride, a mixture of two racemic forms, isomers A and B, were dissolved in 1000 cc. of water, and two mole equivalents of 40% sodium hydroxide were added. The resulting solution was heated in an open beaker on a steam bath at 65–75° C. for about four hours. The resulting crystalline precipitate was removed by filtration, and the heating process was repeated. In this manner, a total of 411.8 g. of tetrahydroisoquinolone was isolated in five drops of crystals, and consisted of a mixture of two racemic forms which melted from about 135–165° C. Rearrangement of the higher melting amine hydrochloride, isomer A, of melting point about 265–269° C. dec., resulted in the lower melting tetrahydroisoquinolone, isomer B, which melted at 127–129° C. Rearrangement of the lower melting amine hydrochloride, isomer B, which melted around 237–243° C. dec., gave the higher melting racemic form of the tetrahydroisoquinolon, isomer A, which melted at 184–185° C.

Example 4

For the preparation of 4-hydroxy-3-propyl-1,2,3,4-tetrahydroisoquinolon-1

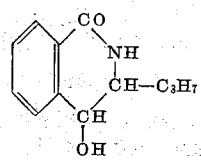

54 grams of 1-amino-1-phthalidylbutane hydrochloride were dissolved in 250 cc. of water and treated with 35 cc. of 40% sodium hydroxide. An oil precipitated after the reaction solution was heated at about 75–85° C. for about five hours. This tetrahydroisoquinolone did not crystallize but was shown to be the desired product by dehydration to 3-propyl-1,2-dihydroisoquinolon-1 by dissolving it in concentrated sulfuric acid, heating the resulting solution on the steam bath for an hour, and pouring the hot solution onto ice. The resulting solid product was collected and crystallized from alcohol. This 3-propyl-1,2-dihydroisoquinolon-1 was obtained as colorless needles which melted at 129–130° C. (capillary). It analyzed as follows:

Anal. calcd. for $C_{12}H_{13}ON$: C, 76.98; H, 6.95; N, 7.48. Found: C, 77.15, 77.04; H, 6.98, 7.00; N, 7.62, 7.63.

Example 5

For the preparation of 4-hydroxy-3-butyl-1,2,3,4-tetrahydroisoquinolon-1

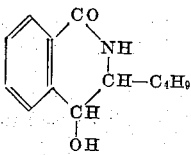

21 grams of 1-amino-1-phthalidylpentane hydrochloride were dissolved in 250 cc. of water, and 11.2 cc. of 40% sodium hydroxide were added. The solution was heated at about 75–85° C. for three hours and concentrated with a current of air to about 75–100 cc. In this case, the desired product did not spontaneously separate, and it was necessary to add 6.6 cc. of concentrated hydrochloric acid. This caused a viscous oil to separate. This product did not crystallize, but it was shown to be the desired tetrahydroisoquinolone by dehydration to 3-butyl-1,2-dihydroisoquinolon-1 according to the procedure used in the preceding example. The dihydroisoquinolone so obtained was recrystallized from isopropanol and was obtained as nearly colorless

Example 6

For the preparation of 4-hydroxy-3-ethyl-6,7-dimethyl-1,2,3,4-tetrahydroisoquinolon-1

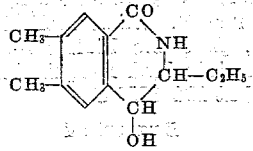

This compound will be prepared by heating an alkaline solution of 1-amino-1-(5,6-dimethylphthalidyl) propane as the starting material, using the procedure described in Example 1.

Example 7

For the preparation of 4-hydroxy-7-ethyl-1,2,3,4-tetrahydroisoquinolon-1

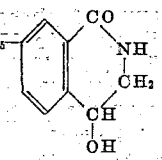

This compound will be prepared by heating an alkaline solution of amino-(6-ethylpthalidyl)-methane as starting material using the procedure described in Example 1.

Example 8

For the preparation of 4-hydroxy-3-propyl-6,7-dimethoxy-1,2,3,4-tetrahydroisoquinolon-1

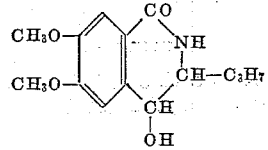

This compound will be prepared by heating an alkaline solution of 1-amino-1-(5,6-dimethoxyphthalidyl)-butane as starting material using the procedure described in Example 1.

Example 9

For the preparation of 4-hydroxy-3-ethyl-7,8-dimethoxy-1,2,3,4-tetrahydroisoquinolon-1

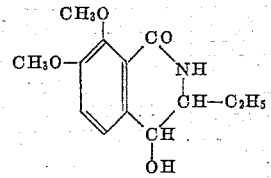

This compound will be prepared by heating an alkaline solution of 1-amino-1-(6,7-dimethoxyphthalidyl)-propane as starting material using the procedure described in Example 1.

Example 10

For the preparation of 4-hydroxy-3-phenyl-7-ethoxy-1,2,3,4-tetrahydroisoquinolon-1

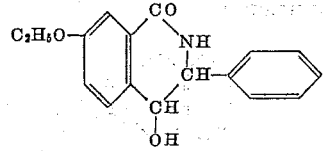

This compound will be prepared by heating an alkaline solution of amino-(6-ethoxyphthalidyl)-phenylmethane as starting material using the procedure described in Example 1.

Example 11

For the preparation of 4,6,7-trihydroxy-3-benzyl-1,2,3,4-tetrahydroisoquinolon-1

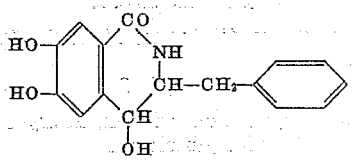

This compound will be prepared by heating an alkaline solution of 1-amino-1-(5,6-dihydroxyphthalidyl)-2-phenylethane as starting material using the procedure described in Example 1.

Example 12

For the preparation of 4-hydroxy-3-ethyl-7-amino-1,2,3,4-tetrahydroisoquinolon-1

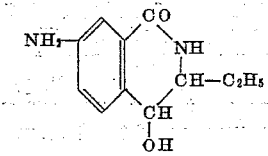

This compound was prepared by the rearrangement of 1-amino-1-(6-aminophthalidyl)-propane dihydrochloride, which in turn was prepared by the reduction of 1-(6-nitrophthalidyl)-1-nitropropane as described below. This starting material, the dinitrophthalidylpropane in turn was prepared in the following manner, using generally the procedure of Shriner and Keyser (J. Org. Chem., volume 5, 200 (1940)).

A solution of 22.1 gms. of 1-nitro-1-phthalidylpropane melting at 94–96° C. in 20 ml. of concentrated sulfuric acid was added dropwise with stirring to a mixture of 11 gms. of potassium nitrate and 33 ml. of concentrated sulfuric acid, the reaction temperature being maintained lower than 5° C. After stirring for three hours at less than 10° C., the mixture was allowed to stand at room temperature for 16 hours and poured over cracked ice. The granular solid which separated was filtered and dried and melted at 93–96° C. Recrystallization from alcohol provided a product melting at 95–98° C.

30 gms. of the above dinitrophthalidylpropane was reduced using 160 cc. of glacial acetic acid and 0.1 gm. of platinum oxide at a temperature of 60–80°. One hundred per cent. of the theoretical volume of hydrogen corresponding to the reduction of one nitro group was taken up in a period of 10 minutes. The hot solution was filtered and cooled, and the light orange product which separated was collected, M. P. 178–181° C. Digestion with hot alcohol and

--- to pale yellow leaflets which melted at 139.5–140.5° C. (Fisher block). It analyzed as follows:

Anal. calcd. for $C_{13}H_{14}ON$: C, 77.58; H, 7.51; N, 6.96. Found: C, 77.43, 77.60; H, 7.36, 7.25; N, 7.03, 7.08.

butanone gave a product, 1-(6-aminophthalidyl)-1-nitropropane, melting at 182–184° C.

113 gms. of 1-nitro-1-(6-aminophthalidyl)-propane was reduced using a saturated aqueous solution containing one equivalent of hydrochloric acid under 50 pounds per square inch pressure of hydrogen at 60° C. using a palladium-on-carbon catalyst. After removal of the catalyst the aqueous solution containing 1-amino-1-(6 - aminophthalidyl)-propane dihydrochloride was made definitely alkaline by the addition of excess 40% sodium hydroxide solution to effect rearrangement to the corresponding isoquinolon. The resulting mixture was heated at 90° C. under vacuum and 1.5 liters of water was slowly distilled for a period of six hours. Heating was then continued for a period of 5 hours removing an additional 250 cc. of water. The dark mixture was then cooled to 10° and the solid was removed by filtration. The dark filtrate was then acidified and further filtered to remove additional salt, and cooled over a long period of time. The yield was a white crystalline powder product of 7-amino-3-ethyl-4-hydroxy-1,2,3,4-tetrahydroisoquinolon-1 which melted at 216–217° C.

*Example 13*

4-hydroxy-3-ethyl-7-acetylamino-1,2,3,4-tetrahydroisoquinolon-1

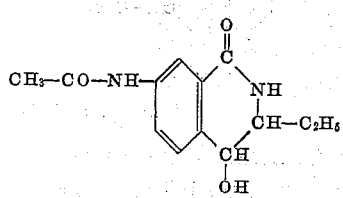

This compound is prepared from 1-amino-1-(6-acetylaminophthalidyl)-propane dihydrochloride by rearrangement using the procedure of Example 12. The starting material for this reaction is prepared by treating 1-(6-aminophthalidyl)-1-nitropropane prepared as an intermediate in Example 12 with acetic anhydride in the usual manner to effect acetylation of the amine nitrogen. The nitro group of the acetylamino compound resulting will be subsequently reduced using the procedure of Example 12 for reduction of 1-(6-aminophthalidyl)-1-nitropropane.

*Example 14*

4-hydroxy-3-ethyl-7-butyrylamino-1,2,3,4-tetrahydroisoquinolon-1

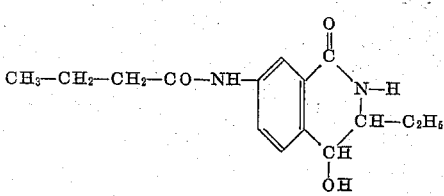

This compound will be prepared by rearrangement of 1-amino-1-(6-butyrylaminophthalidyl)-propane dihydrochloride using the procedure of Example 12. The starting material is prepared by subjecting 1-(6-aminophthalidyl)-1-nitropropane to treatment in the usual manner with butyric anhydride to effect N-butyrylation. The nitro group of the resulting butyrylamino compound is then reduced using the procedure of Example 12.

*Example 15*

4-hydroxy-3-ethyl-7-dimethylamino-1,2,3,4-tetrahydroisoquinolon-1

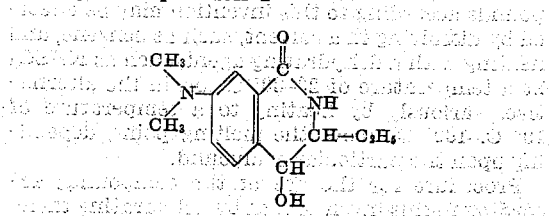

This compound is prepared by the rearrangement of 1-(6-dimethylaminophthalidyl)-1-aminopropane using the procedure of Example 12. The starting material is prepared from 1-(6-aminophthalidyl)-1-nitropropane prepared as an intermediate in Example 12. This compound is methylated on the amino group by treatment with formaldehyde and formic acid according to the procedure of Clark et al., J. A. C. S. 55, 4571 (1933). The nitro group of the resulting dimethylamino compound is reduced to the corresponding amino compound using the procedure of Example 12.

*Example 16*

4 - hydroxy - 3 - phenyl - 1,2,3,4 - tetrahydroisoquinolon-1

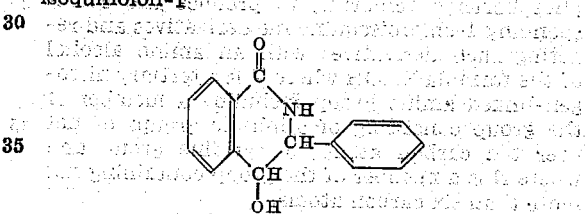

This compound is prepared by rearranging aminophenylphthalidylmethane (phenylphthalidyl carbinamine) by the procedure of Example 1.

*Example 17*

3-n-amyl-1,2,3,4-tetrahydroisoquinolon-1

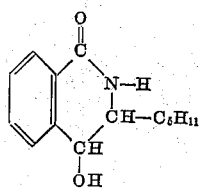

To a solution of 1.0 g. of 1-amino-1-phthalidylhexane hydrochloride in 25 cc. of warm water was added a solution of 0.4 g. of sodium hydroxide in 5 cc. of water. The resulting mixture was heated just below reflux for 20 hours. The oil which separated was taken into chloroform and the chloroform was removed by distillation in vacuo. The white solid which remained was shown to be the desired product in the following way. The solid was dissolved in 7.5 cc. of concentrated sulfuric acid and this solution was heated at 75° for 35 minutes. It was then cooled and poured into cracked ice. The white solid was removed by filtration, washed with water and recrystallized three times from isopropanol, melting at 106.5–108°.

As illustrative of the use of the novel compounds in accordance with this invention, they may, for example, be used as intermediates for the formation of corresponding pyridine derivatives by dehydrating them, for example, by heating them at a temperature above their melting points and below their decomposition points, or by treating them with a dehydrating agent, such as sulfuric acid, phosphorus pentoxide, or the like. More specifically, the dehydration of the compounds according to this invention may be effected by dissolving in a solvent, such as benzene, and heating with a dehydrating agent, such as KHSO4 at a temperature of 20-80° C., or, in the alternative, variously by heating to a temperature of 10° C.-100° C. above the melting point, depending upon the particular compound.

Procedure for the use of the compounds according to this invention, as by dehydrating them, as by treating or treatment with a dehydrating agent, as sulfuric acid, phosphorus pentoxide or the like, for the production of intermediates for use in the production of compounds having physiological properties, is the subject-matter of application for U. S. patent filed by me August 17, 1946, Serial No. 691,394, now abandoned.

The operative derivatives produced by the use of the compounds according to this invention will be produced as intermediates, more particularly by dehydrating the compounds in accordance with this invention and will be used for the production of corresponding aminoalkoxyisoquinoline derivatives having physiological properties, as analgesic and local anesthetic properties, by treating them with a reagent, as, for example, phosphorus oxychloride, to produce the corresponding 1-chloroisoquinoline derivatives and reacting such derivatives with an amino alcohol of the formula YROH where Y is a tertiary nitrogen-linked amino group including a member of the group consisting of aliphatic groups of not over ten carbon atoms, a pyridine group and where N is a member of the group containing not more than six carbon atoms.

More specifically, the intermediates produced by the dehydration of compounds in accordance with this invention will be converted to the 1-chloro derivatives by heating under reflux until the evolution of hydrogen chloride ceases. The excess oxychloride is then removed by distillation and the product purified by distillation in vacuo. The 1-chloro derivatives are then treated with an alkali metal derivative of an amino alcohol of the type indicated by adding the 1-chloro derivative to a suspension or solution of the alkali metal derivative of the amino alcohol, the addition being made rapidly with stirring, followed by heating, with continued stirring, to a temperature up to the boiling point of the solvent. On completion of the reaction, the reaction mixture is cooled and evaporated to remove precipitated metal chloride, the solvent removed by distillation and the aminoalkoxyisoquinoline derivative purified by distillation in vacuo, all as more specifically disclosed in application for United States patent filed by me August 20, 1948, Serial No. 45,432, now abandoned.

This application is a continuation-in-part of application filed by me August 17, 1946, Serial No. 691,393, now abandoned.

The method disclosed herein for making compounds claimed herein is the subject matter of a copending application filed by me September 20, 1949, Serial No. 116,868, now Patent No. 2,538,342, issued January 16, 1951.

What is claimed is:

A compound having the structure:

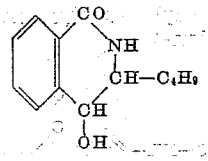

GLENN E. ULLYOT.

References Cited in the file of this patent

Beilstein — "Handbuch der organischen Chemie" (4th Ed.), vol. XXI, page 582 (1935).

Gabriel et al.: "Berichte," vol. 33, pp. 980-1000 (1900).

Ullyot et al.—J. Org. Chem., vol. 10, pp. 429-440 (1945).